(12) United States Patent
Mori et al.

(10) Patent No.: US 8,727,373 B2
(45) Date of Patent: May 20, 2014

(54) CURTAIN SHIELD AIRBAG MOUNTING STRUCTURE

(71) Applicant: Toyoda Gosei Co., Ltd., Kiyosu (JP)

(72) Inventors: Minako Mori, Kariya (JP); Fuminori Kimura, Kariya (JP); Atsushi Kashio, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 14/010,939

(22) Filed: Aug. 27, 2013

(65) Prior Publication Data

US 2014/0062066 A1     Mar. 6, 2014

(30) Foreign Application Priority Data

Aug. 31, 2012  (JP) ................................ 2012-191480

(51) Int. Cl.
*B60R 21/213*   (2011.01)

(52) U.S. Cl.
USPC ..................................... 280/728.2; 280/730.2

(58) Field of Classification Search
USPC .................................. 280/730.2, 728.2, 730.1
See application file for complete search history.

(56) References Cited

U.S. PATENT DOCUMENTS

| 7,380,815 | B2 * | 6/2008 | Rose et al. | 280/730.2 |
| 7,712,775 | B2 * | 5/2010 | Sato et al. | 280/730.2 |
| 7,735,853 | B2 * | 6/2010 | Fink | 280/728.2 |
| 7,810,838 | B2 * | 10/2010 | Iwayama et al. | 280/730.2 |
| 8,414,020 | B2 | 4/2013 | Beppu et al. | |
| 2011/0127755 | A1 | 6/2011 | Beppu et al. | |
| 2012/0267879 | A1 * | 10/2012 | Kim et al. | 280/730.2 |

FOREIGN PATENT DOCUMENTS

| JP | 2011-105079 A | 6/2011 |
| WO | 2010/007740 A1 | 1/2010 |

\* cited by examiner

*Primary Examiner* — Drew Brown (74) *Attorney, Agent, or Firm* — Posz Law Group, PLC (57) ABSTRACT

In a curtain shield airbag mounting structure for mounting a curtain shield airbag to a side upper portion of a vehicle body, the curtain shield airbag includes an airbag main body and a resin case which holds the airbag main body. A base end portion of a folded-back portion of the airbag main body is disposed to oppose a boundary portion between a rear pillar garnish and a ceiling member, or in the vicinity thereof. A guide wall portion is provided at a rear end portion of the resin guide case. The guide wall portion opposes a rear end side of a base end portion of the folded-back portion and prevents the folded-back portion from colliding with the rear pillar garnish when the folded-back portion opens while pushing out a part of the ceiling member.

7 Claims, 6 Drawing Sheets

FIG. 6

CURTAIN SHIELD AIRBAG MOUNTING STRUCTURE

BACKGROUND

1. Technical Field

The present invention relates to a structure in which a curtain shield airbag is mountable to a side upper portion of a vehicle body.

2. Background Art

A curtain shield airbag is mounted in a side upper portion of a vehicle body of a motor vehicle and inflates to deploy so as to cover a pane of glass in a side door to thereby protect a head portion of an occupant when the motor vehicle is involved in a collision. In addition, since the curtain shield airbag which is long is installed on a back side of an interior member, it is general practice to fold back a rear end portion of the airbag.

For example, in an airbag system described in Patent Document 1, it is disclosed that an airbag is compressed into an elongated flat configuration when in an installed state with an end portion folded back along a longitudinal direction thereof. In addition, it is also disclosed that a restricting member is provided in the airbag which restricts the folded-back end portion of the airbag from inflating to deploy transversely toward a vehicle exterior. Then, a smooth deployment of the airbag is attained by this configuration.

In addition, for example, in a mounting structure of a curtain airbag deployment assisting member in a vehicle described in Patent Document 2, the provision of a deployment assisting member is disclosed which guides an airbag into a vehicle interior when the airbag inflates for deployment. Additionally, when the airbag inflates for deployment, a reinforcement rib of the deployment assisting member contacts an inner panel. By adopting this configuration, a further increase in the guiding performance of the deployment assisting member is attained.

Patent Document 1: WO-A1-2010/007740
Patent Document 2: JP-A-2011-105079

SUMMARY

In the curtain shield airbag mounting structure described above, however, there are fears that the folded-back portion of the end portion of the airbag comes into collision with a rear pillar garnish which is situated rearwards of a ceiling member when the airbag inflates for deployment. Because of this, the rear pillar garnish needs to be prevented from being dislocated from the vehicle body, which makes the mounting structure complex.

The invention has been made in view of the background described above and is obtained as a result of attempting to provide a curtain shield airbag mounting structure which prevents the application of an extra load to a rear pillar garnish to thereby simplify the structure of a portion where the rear pillar garnish mounted on a vehicle body.

In a first aspect, there is provided a curtain shield airbag mounting structure including: a curtain shield airbag which is mounted to a side upper portion of a vehicle body, and which includes: an airbag main body which inflates for deployment in response to a vehicle collision; and a resin guide case which holds the airbag main body to mount the airbag main body to the vehicle body, wherein the airbag main body comprises a general portion and a folded-back portion provided on a rear side of the general portion, the folded-back portion being formed by folding back a rear end portion of the airbag main body toward a front side and fastened to the general portion, wherein a base end portion of the folded-back portion is disposed to oppose a boundary portion or in a vicinity thereof, the boundary portion being defined between a rear pillar garnish mounted on a vehicle interior side of the vehicle body at a rear portion of the side upper portion of the vehicle body and a ceiling member mounted on the vehicle interior side of the vehicle body in a position on a front side of the rear pillar garnish, and wherein a guide wall portion is provided at a rear end portion of the resin guide case, the guide wall portion being disposed to oppose a rear end side of the base end portion of the folded-back portion and preventing the folded-back portion of the airbag main body from colliding with the rear pillar garnish when the folded-back portion opens while pushing out a part of the ceiling member.

In a second aspect, a curtain shield airbag mountable to a vehicle body, including: an airbag main body which inflates in response to a vehicle collision and which comprises a general portion and a folded-back portion provided on a rear side of the general portion, the folded-back portion being folded back toward a front side and fastened to the general portion; and a resin guide case which holds the airbag main body and which is mountable to an upper side portion of the vehicle body such that a base end portion opposes a boundary portion or in a vicinity thereof, the boundary portion being defined between a rear pillar garnish mounted on a vehicle interior side of the vehicle body at a rear portion of the side upper portion of the vehicle body and a ceiling member mounted on the vehicle interior side of the vehicle body in a position on a front side of the rear pillar garnish, wherein the resin guide case comprises a guide wall portion provided at a rear end portion of the resin guide case, and wherein the guide wall portion opposes a rear end side of the base end portion of the folded-back portion, whereby when the curtain shield airbag is mounted to the vehicle body, the guide wall portion prevents the folded-back portion of the airbag main body from colliding with the rear pillar garnish when the folded-back portion opens while pushing out a part of the ceiling member.

In the curtain shield airbag (hereinafter, referred to simply as an airbag) mounting structure and the airbag described above, in a case in which the folded-back portion is provided at the rear end portion of the airbag main body, it is possible to prevent the rear pillar garnish from being dislocated from the vehicle body when the airbag inflates for deployment.

Specifically, the base end portion of the folded-back portion of the airbag main body opposes the boundary portion or in the vicinity thereof, the boundary portion being defined between the rear pillar garnish and the ceiling member, and the guide wall portion is provided at the rear end portion of the resin guide case of the airbag.

When the airbag main body inflates to deploy into the vehicle interior in response to the vehicle collision, a part of the ceiling member is pushed out toward the vehicle interior by the inflating airbag main body. In addition, the folded-back portion of the airbag main body opens toward the vehicle interior. As these occur, although the folded-back portion of the airbag main body is brought into collision with the vicinity of the boundary portion with the rear pillar garnish, attempting to push out the boundary portion or in the vicinity thereof toward the vehicle interior, the guide wall portion can prevent the attempt.

Because of this, no extra load is applied to the rear pillar garnish when the airbag inflates for deployment, thereby making it possible to simplify the structure of the portion in which the rear pillar garnish is mounted to the vehicle body.

DETAILED DESCRIPTION

A preferred embodiment of the curtain shield airbag mounting structure described above will be described.

The guide wall portion may be bent from the rear end portion of the resin guide case toward the vehicle interior.

As this occurs, the folded-back portion can be guided toward the vehicle interior in a stable fashion by the guide wall portion when the airbag inflates for deployment.

In the curtain shield airbag mounting structure, the end portion of the guide wall portion situated on the vehicle interior side thereof may contact the rear surface of the ceiling member.

In this case, the ceiling member can be borne by the guide wall portion, thereby making it possible to prevent the loosening of the ceiling member.

In addition, the guide wall portion may have a shape of a vessel formed by a plate portion such that an interior thereof becomes hollow.

In this case, a reduction in weight of the guide wall portion can be realized with a required strength maintained.

Hereinafter, a curtain shield airbag mounting structure according to an embodiment of the invention will be described by reference to the drawings.

Figure 1:
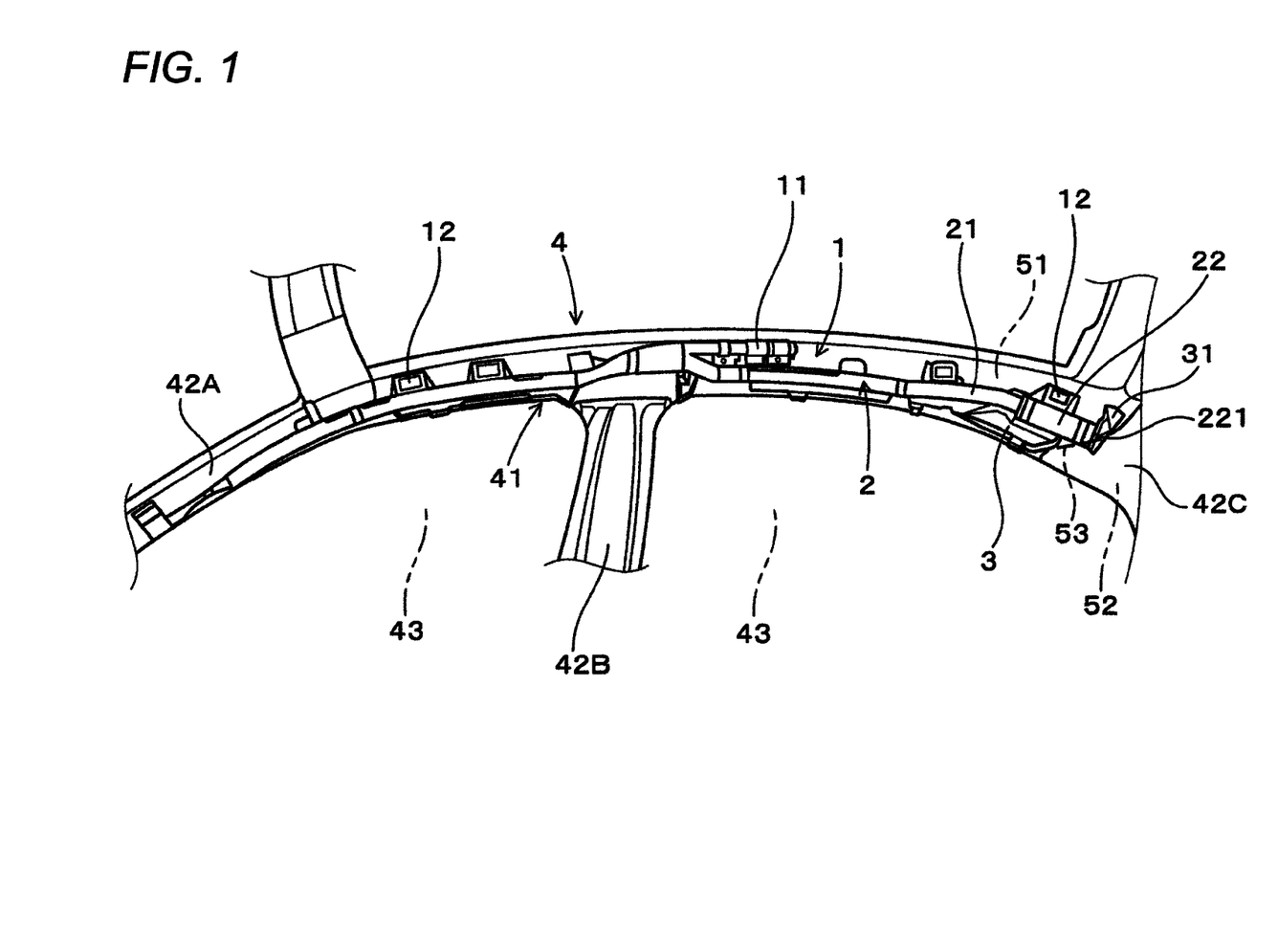
FIG. 1 is an overall view of a curtain shield airbag mounting structure according to an embodiment of the invention.

A curtain shield airbag mounting structure for a curtain shield airbag 1 (hereinafter, referred to simply as an airbag 1) according to this embodiment is such that the airbag 1 is mounted in a side upper portion 41 of a vehicle body 4 of a motor vehicle as shown in FIG. 1. The airbag 1 has an airbag main body 2 which can inflate for deployment when the motor vehicle is involved in a collision and a resin guide case 3 which holds the airbag main body 2 to mount it on the vehicle body 4. The airbag main body 2 has a folded-back portion 22 at a rear end portion thereof where the rear end portion is folded back to the front, and this folded-back portion 22 is fastened to a general portion 21 of the airbag main body 2.

Figure 2:
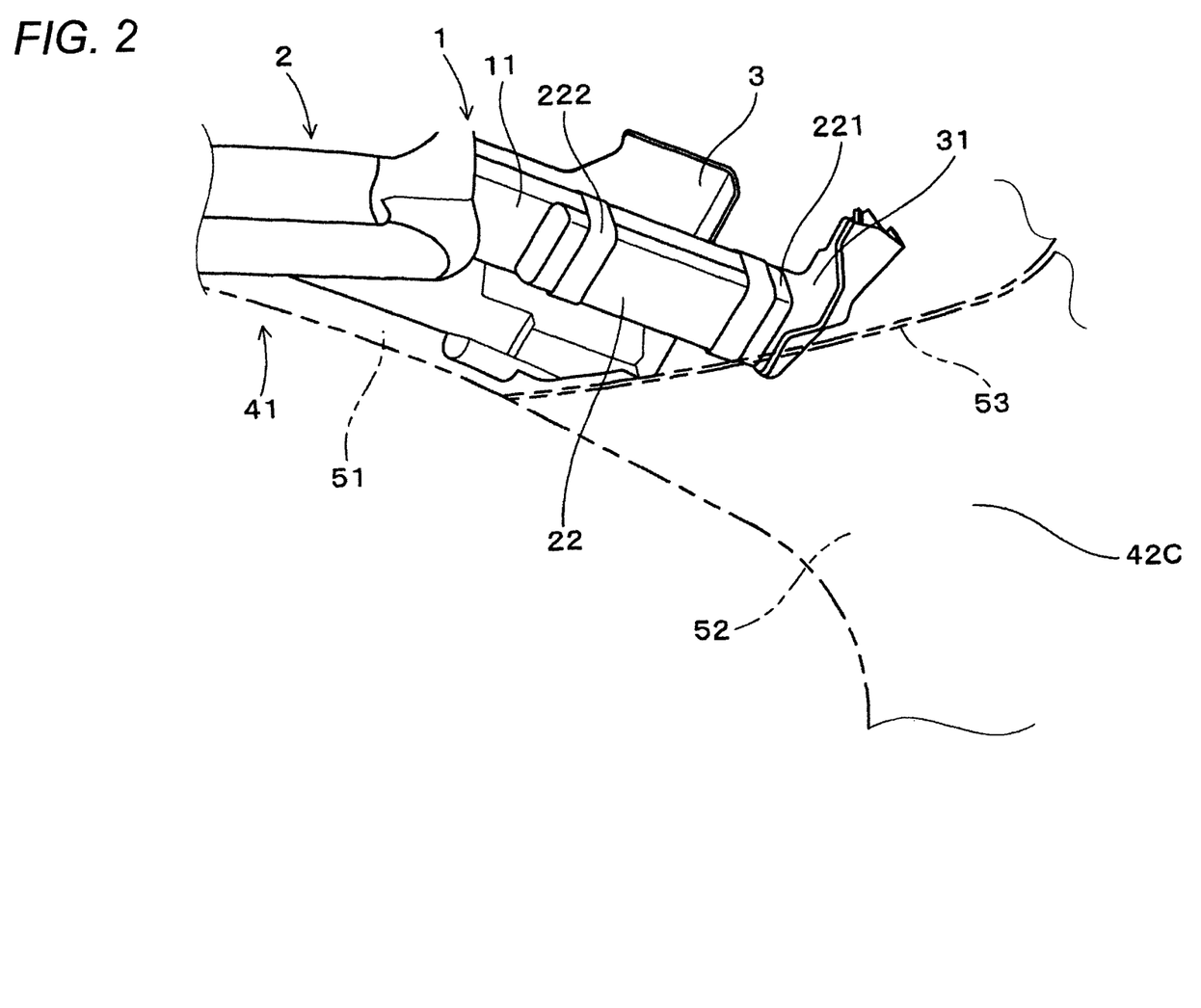
FIG. 2 is a perspective view showing the vicinity of a boundary portion between a rear pillar garnish and a ceiling member according to the embodiment.
Figure 3:
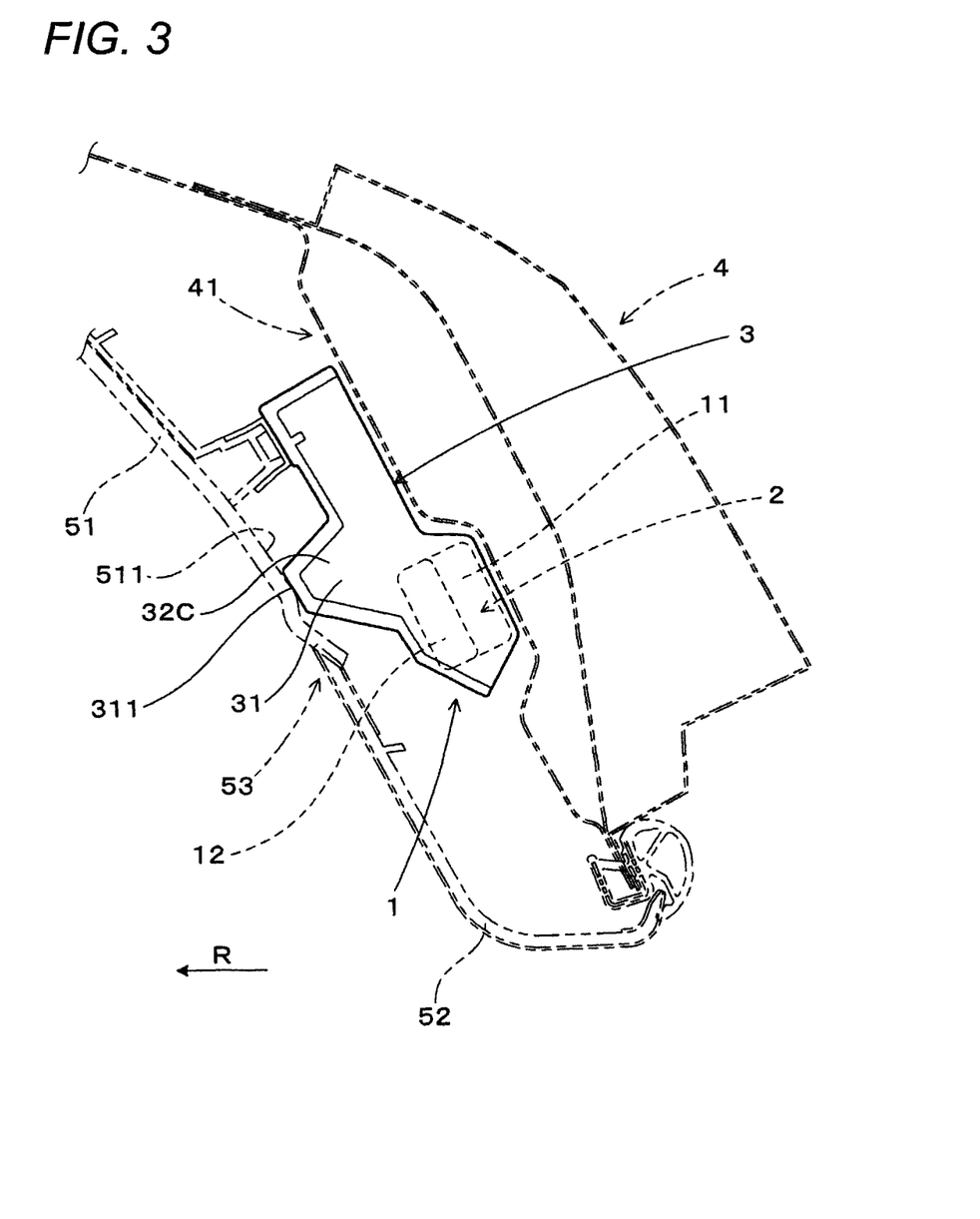
FIG. 3 is an explanatory diagram showing a guide wall portion as seen from the rear in a section taken across the boundary portion between the ceiling member and the rear pillar garnish according to the embodiment.

As shown in FIGS. 2, 3, a base end portion 221 of the folded-back portion 22 is disposed so as to oppose the vicinity of a boundary portion 53 between a rear pillar garnish 52 which is mounted on a vehicle interior side R of the vehicle body 4 at the rear of the side upper portion 41 of the vehicle body 4 and a ceiling member 51 which is mounted on the vehicle interior side R of the vehicle body 4 in a position lying further forwards than the rear pillar garnish 52. A guide wall portion 31 is provided at a rear end portion of the resin guide case 3. This guide wall portion 31 is disposed so as to oppose a rear end side of the base end portion 221 of the folded-back portion 22 and prevents the collision of the folded-back portion 22 with the rear pillar garnish 52 when the folded-back portion 22 of the airbag main body 2 opens while pushing out part of the ceiling member 51.

Hereinafter, a mounting structure of the airbag 1 according to the embodiment will be described in detail by reference to FIGS. 1 to 6.

As shown in FIG. 1, the airbag 1 is disposed in an upper portion of a vehicle body 42 which corresponds to side doors of the motor vehicle. The airbag 1 inflates to deploy so as to cover surfaces of panes of glass 43 in the side doors to thereby protect sides of head portions of occupants when the motor vehicle is involved in a collision. In addition, an inflator 11 is provided in the airbag 1. When the motor vehicle is involved in a collision, this inflator 11 generates gas and supplies the gas generated into the airbag 1 for inflation thereof. The inflator 11 is mounted in a longitudinally intermediate position between a front-side portion of the airbag main body 2 and a rear-side portion of the airbag main body 2 so that the gas is supplied into both the front-side and rear-side portions of the airbag main body 2.

In this embodiment, the motor vehicle is a coupe or a sporty sedan and has a sloping rear, and hence, a ceiling over rear passenger seats slopes down toward the rear of the motor vehicle.

The rear pillar garnish 52 is situated at a rearmost portion among a plurality of pillar garnishes, and in this embodiment, the rear pillar garnish 52 is a C pillar garnish which is provided on the vehicle interior side R of the vehicle body 4 or a C pillar 42C which is situated in a third frontmost position from the front of the motor vehicle. In the vehicle body 4, there are an A pillar 42A and a B pillar 42B which are situated forwards of the C pillar 42C, the A pillar 42A being situated in a frontmost position among the three pillars, the B pillar being situated in a second frontmost position from the front of the motor vehicle.

The airbag 1 is mounted at the side upper portion 41 of the vehicle body 4 with fixtures 12 such as a plurality of temporary fastening claws, machine screws or clips.

As shown in FIGS. 2, 3, the ceiling member 51 and the rear pillar garnish 52 contact each other at an upper portion of the rearmost pillar (the C pillar) 42C to thereby form the boundary portion 53. The guide wall portion 31 opposes the whole of the rear of the rear end portion of the folded-back portion 22 of the airbag 1 and is formed so as to extend upwards from the portion where the guide wall portion 31 opposes the folded-back portion 22. Additionally, the guide wall portion 31 is formed so as to be bent toward the vehicle interior from a rear end portion of the resin guide case 3. The resin guide case 3 is provided so as to extend over almost a full length of the airbag main body 2 and is used to mount the whole of the airbag main body 2 on the vehicle body 4.

The folded-back portion 22 of the airbag main body 2 is fastened to the general portion 21 with a binding material 222 such as a tape in such a state that the end portion of the airbag main body 2 is folded back onto the general portion 21.

FIG. 3 shows a state in which the guide wall portion 31 is seen from the rear in a section taken across the boundary portion 53 between the ceiling member 51 and the rear pillar garnish 52. An end portion 311 of the guide wall portion 31 situated on the vehicle interior side R contacts a rear surface 511 of the ceiling portion 51. The rear surface 511 of the ceiling member 51 is borne by the guide wall portion 31, whereby the loosening of the ceiling member 51 can be prevented. Additionally, the ceiling member 51 and the rear pillar garnish 52 are mounted on the vehicle body 4.

Figure 4:
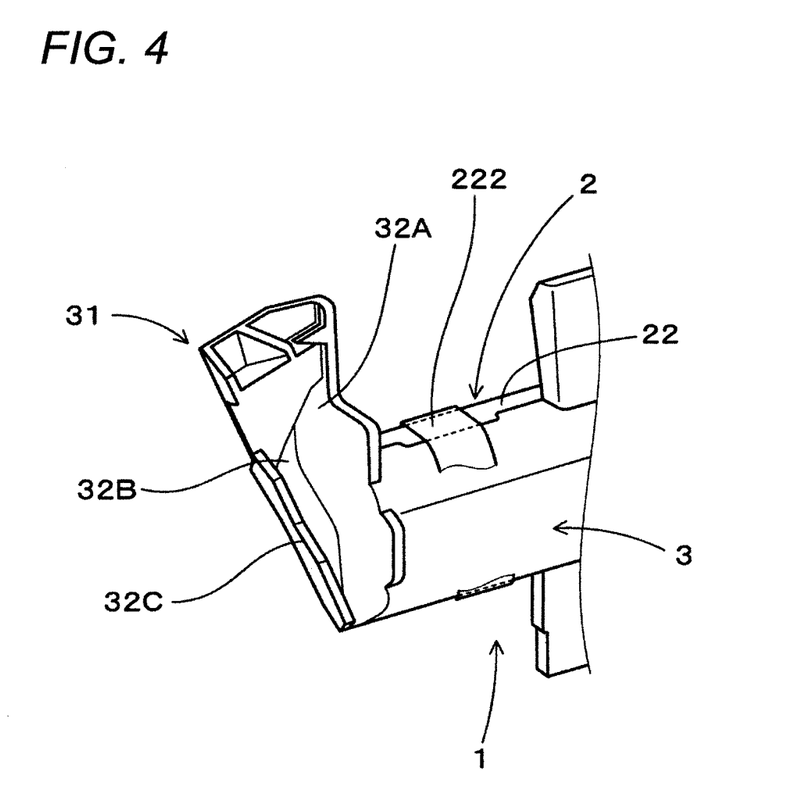
FIG. 4 is an explanatory diagram showing the guide wall portion as seen from a back side thereof according to the embodiment.

FIG. 4 shows a state in which the guide wall portion 31 is seen from a rear surface side thereof. As shown in FIG. 4, the guide wall portion 31 is formed into the shape of a vessel by plate-like portions 32A, 32B, 32C so that an interior of the guide wall portion 31 becomes hollow in order to realize a reduction in weight thereof while holding a required strength. The guide wall portion 31 has the front-side plate-like portion 32A which opposes the base end portion 221 of the folded-back portion 22 of the airbag main body 2, the intermediate plate-like portion 32B which is formed rearwards of the front-side plate-like portion 32A, and the rear-side plate-like portion 32C which is formed from the intermediate plate-like portion 32B so as to oppose the front-side plate-like portion 32A.

Figure 5:
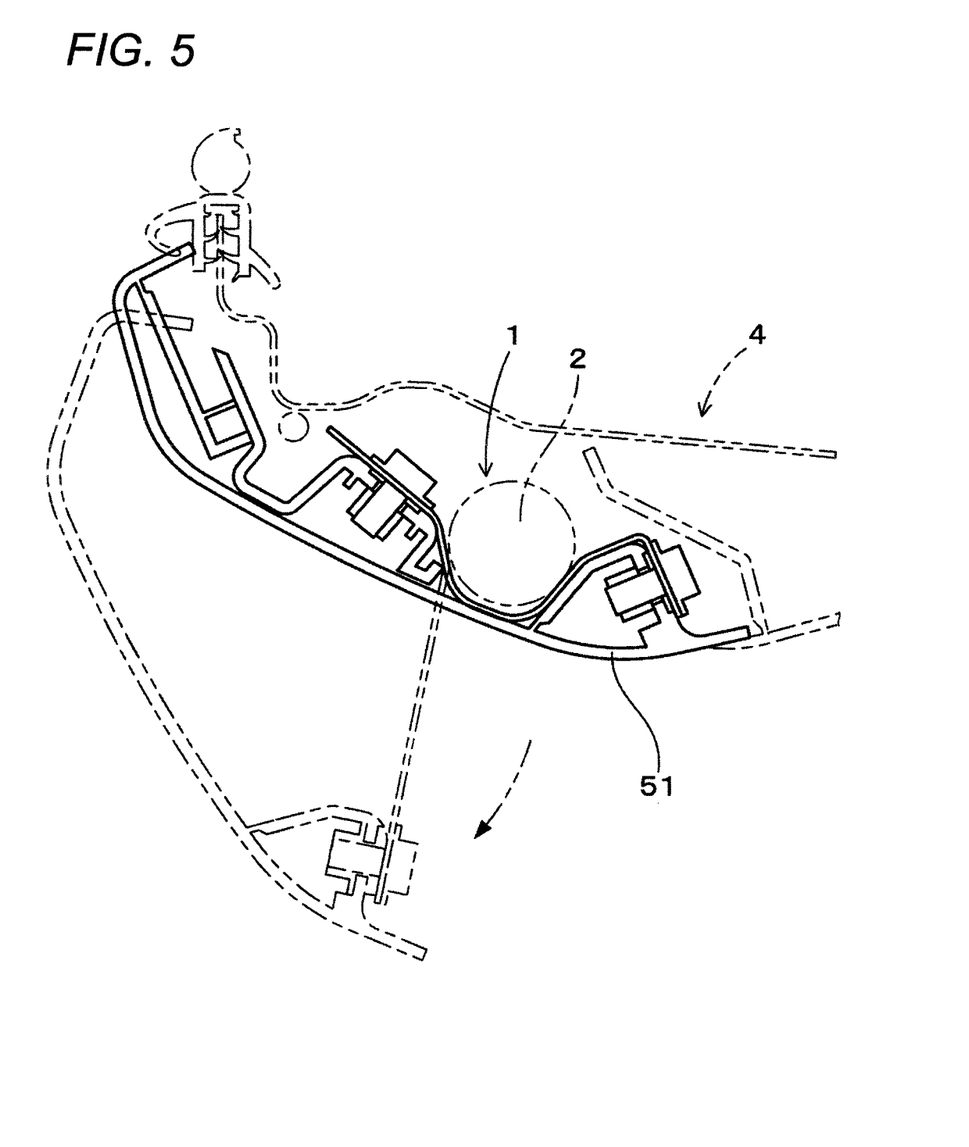
FIG. 5 is an explanatory diagram showing a general section where a vehicle interior side of an airbag mounted on a vehicle body is covered by the ceiling member according to the embodiment.

FIG. 5 shows a general section where a side, facing the vehicle interior side R, of the airbag 1 which is mounted on the vehicle body 4 is covered by the ceiling member 51. When the airbag 1 inflates for deployment, part of the ceiling member 51 is pushed toward the vehicle interior side R to be opened by the inflating airbag 1. In FIG. 5, the state in which part of the ceiling member 51 is opened is indicated by chain double-dashed lines.

Figure 6:
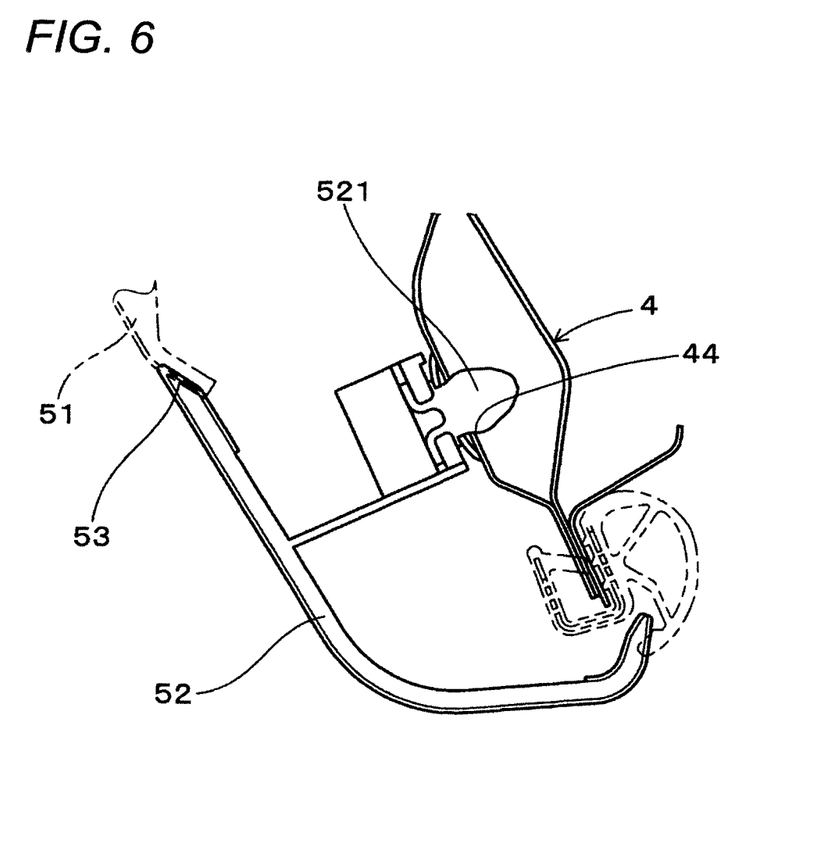
FIG. 6 is an explanatory diagram showing a general section where the rear pillar garnish is mounted on the vehicle body according to the embodiment.

FIG. 6 shows a general section where the rear pillar garnish 52 is mounted on the vehicle body 4. The rear pillar garnish 52 is mounted on the vehicle body 4 with an extremely simple structure which employs clips 521 which are locked in place in locking holes 44 formed in the vehicle body 4 by being forced thereinto.

In the airbag mounting structure for mounting the airbag 1 on the vehicle body 4 according to the embodiment, the folded-back portion 22 is provided at the rear end portion of the airbag main body 2, and hence, the rear pillar garnish 52 is devised so as not to be dislocated from the vehicle body 4 when the airbag 1 inflates for deployment.

Specifically, the base end portion 221 of the folded-back portion 22 of the airbag main body 2 is disposed so as to oppose the vicinity of the boundary portion 53 between the rear pillar garnish 52 and the ceiling member 51, and the guide wall portion 31 is provided at the rear end portion of the resin guide case 3 of the airbag 1.

When the airbag main body 2 inflates to deploy into the vehicle interior when the motor vehicle is involved in a collision, part of the ceiling member 51 is pushed out toward the vehicle interior side R by the inflating airbag main body 2. Additionally, the folded-back portion 22 of the airbag main body 2 opens toward the vehicle interior side R. As this occurs, although the folded-back portion 22 of the airbag main body 2 is brought into collision with the portion of the rear pillar garnish 52 which lies in the vicinity of the boundary portion 53 to thereby attempt to push out that portion lying in the vicinity of the boundary portion 53 toward the vehicle interior side R, the guide wall portion 31 can prevent the attainment of the attempt.

Because of this, no extra load is applied to the rear pillar garnish 52 when the airbag 1 inflates for deployment, whereby the structure of the portion where the rear pillar garnish 52 is mounted on the vehicle body 4 can be simplified.

What is claimed is:

1. A curtain shield airbag mounting structure comprising:
   a curtain shield airbag which is mounted to a side upper portion of a vehicle body, and which comprises:
   an airbag main body which inflates for deployment in response to a vehicle collision; and
   a resin guide case which holds the airbag main body to mount the airbag main body to the vehicle body,
   wherein the airbag main body comprises a general portion and a folded-back portion provided on a rear side of the general portion, the folded-back portion being formed by folding back a rear end portion of the airbag main body toward a front side and fastened to the general portion,
   wherein a base end portion of the folded-back portion is disposed to oppose a boundary portion or in a vicinity thereof, the boundary portion being defined between a rear pillar garnish mounted on a vehicle interior side of the vehicle body at a rear portion of the side upper portion of the vehicle body and a ceiling member mounted on the vehicle interior side of the vehicle body in a position on a front side of the rear pillar garnish, and
   wherein a guide wall portion is provided at a rear end portion of the resin guide case, the guide wall portion opposing a rear end side of the base end portion of the folded-back portion and preventing the folded-back portion of the airbag main body from colliding with the rear pillar garnish when the folded-back portion opens while pushing out a part of the ceiling member.

2. The curtain shield airbag mounting structure according to claim 1,
   wherein the guide wall portion is bent from the rear end portion of the resin guide case toward the vehicle interior side.

3. The curtain shield airbag mounting structure according to claim 1,
   wherein an end portion of the guide wall portion situated on the vehicle interior side thereof contacts a rear surface of the ceiling member.

4. The curtain shield airbag mounting structure according to claim 1,
   wherein the guide wall portion has a shape of a vessel formed by a plate portion such that an interior thereof becomes hollow.

5. A curtain shield airbag mountable to a vehicle body, comprising:
   an airbag main body which inflates in response to a vehicle collision and which comprises a general portion and a folded-back portion provided on a rear side of the general portion, the folded-back portion being folded back toward a front side and fastened to the general portion; and
   a resin guide case which holds the airbag main body and which is mountable to an upper side portion of the vehicle body such that a base end portion opposes a boundary portion or in a vicinity thereof, the boundary portion being defined between a rear pillar garnish mounted on a vehicle interior side of the vehicle body at a rear portion of the side upper portion of the vehicle body and a ceiling member mounted on the vehicle interior side of the vehicle body in a position on a front side of the rear pillar garnish,
   wherein the resin guide case comprises a guide wall portion provided at a rear end portion of the resin guide case, and
   wherein the guide wall portion opposes a rear end side of the base end portion of the folded-back portion, whereby when the curtain shield airbag is mounted to the vehicle body, the guide wall portion prevents the folded-back portion of the airbag main body from colliding with the rear pillar garnish when the folded-back portion opens while pushing out a part of the ceiling member.

6. The curtain shield airbag mounting structure according to claim 2,
   wherein an end portion of the guide wall portion situated on the vehicle interior side thereof contacts a rear surface of the ceiling member.

7. The curtain shield airbag mounting structure according to claim 2, wherein the guide wall portion has a shape of a vessel formed by a plate portion such that an interior thereof becomes hollow.

* * * * *